United States Patent [19]

Uchikawa

[11] Patent Number: 5,533,332
[45] Date of Patent: Jul. 9, 1996

[54] METHOD AND APPARATUS FOR SELF DIAGNOSIS OF AN INTERNAL COMBUSTION ENGINE

[75] Inventor: Akira Uchikawa, Atsugi, Japan

[73] Assignee: Unisia Jecs Corporation, Atsugi, Japan

[21] Appl. No.: 299,489

[22] Filed: Sep. 1, 1994

[30] Foreign Application Priority Data

Sep. 2, 1993 [JP] Japan ................................. 5-218905

[51] Int. Cl.⁶ ........................................................ F01N 3/20
[52] U.S. Cl. ............................... 60/274; 60/276; 60/277; 60/285; 123/688; 123/691
[58] Field of Search .............................. 60/274, 276, 277, 60/285; 123/688, 691

[56] References Cited

U.S. PATENT DOCUMENTS

| | | | |
|---|---|---|---|
| 5,018,348 | 5/1991 | Durschmidt | 60/277 |
| 5,154,055 | 10/1992 | Nakane | 60/277 |
| 5,220,788 | 6/1993 | Kurita | 60/277 |
| 5,331,808 | 7/1994 | Koike | 123/688 |

FOREIGN PATENT DOCUMENTS

4-72438  3/1992  Japan .

*Primary Examiner*—Douglas Hart
*Attorney, Agent, or Firm*—Foley & Lardner

[57] ABSTRACT

With an air-fuel ratio control apparatus for an internal combustion engine wherein oxygen sensors are respectively arranged upstream and downstream of an exhaust gas purification catalytic converter, air-fuel ratio feedback control is carried out for diagnosis using only the downstream oxygen sensor. When during diagnostic air-fuel ratio feedback control, phase differences of output fluctuations of the two oxygen sensors are below a predetermined value, deterioration of the catalytic converter is judged. A judgment level is variably set based on the results of the deterioration diagnosis of the catalytic converter, and deterioration of response of the downstream oxygen sensor is diagnosed by comparing the output-period of the downstream oxygen sensor with the set judgment level.

13 Claims, 5 Drawing Sheets

METHOD AND APPARATUS FOR SELF DIAGNOSIS OF AN INTERNAL COMBUSTION ENGINE

FIELD OF THE INVENTION

The present invention relates to a method and apparatus for self diagnosis of an internal combustion engine. In particular, the present invention relates to diagnostic technology for diagnosing deterioration in an exhaust gas purification catalytic converter arranged in an exhaust passage, and deterioration in an oxygen sensor for detecting oxygen concentration downstream of the catalytic converter, by consideration of an influence of an oxygen storage effect in the exhaust gas purification catalytic converter.

DESCRIPTION OF THE RELATED ART

Heretofore, there have been various proposals for air-fuel ratio feedback control wherein the air-fuel ratio is feedback controlled based on detection values from two oxygen sensors respectively disposed upstream and downstream of a three-way catalytic converter arranged in an exhaust system for exhaust gas purification (Japanese Unexamined Patent Publication No. 4-72438).

For example, with the air-fuel ratio feedback control apparatus disclosed in Japanese Unexamined Patent Publication No. 4-72438, deviation of an air-fuel ratio control point in an air-fuel ratio feedback control which is based on the detection results of an upstream oxygen sensor, is compensated for by setting an air-fuel ratio feedback correction coefficient using a proportional-plus-integral control based on detection results of the upstream oxygen sensor, and correcting a proportional operating amount (proportional portion) in the proportional-plus-integral control, based on richness or leanness with respect to a target air-fuel ratio detected by a downstream oxygen sensor. The fuel injection quantity is then corrected using the set air-fuel ratio feedback correction coefficient so as to produce a mixture having the target air-fuel ratio.

With such an air-fuel ratio control apparatus, if there is deterioration of the oxygen sensor which detects the air-fuel ratio, the accuracy of the air-fuel ratio feedback control will be reduced, with a deterioration in exhaust gas properties.

An apparatus which can diagnose deterioration of the oxygen sensor therefore becomes desirable. With the oxygen sensor downstream of the catalytic converter however, compared to the oxygen sensor provided upstream of the catalytic converter, it is difficult to diagnose deterioration to a high accuracy since the detection characteristics of the oxygen sensor are changed by the influence of the oxygen storage effect of the catalytic converter, which varies depending on deterioration of the catalytic converter. It is therefore desirable to have an apparatus which can take into consideration the influence of the oxygen storage effect, to make a high accuracy diagnosis.

With regards to the abovementioned oxygen storage effect, this acts such that when the air-fuel ratio is lean oxygen is absorbed, while when the air-fuel ratio is rich, CO and HC are absorbed and reacted with the oxygen from the lean period.

SUMMARY OF THE INVENTION

In view of the above situation, it is an object of the present invention to be able to diagnose a reduction in oxygen storage effect due to deterioration of the exhaust gas purification catalytic converter.

Moreover, it is an object of the present invention to be able to take the diagnosis results of deterioration of the exhaust gas purification catalytic converter, and use these to accurately diagnose deterioration of the oxygen sensor downstream of the catalytic converter, by consideration of the influence of the oxygen storage effect of the catalytic converter.

To achieve the above objectives, the method and apparatus for self diagnosis of an internal combustion engine according to the present invention, employs first and second oxygen sensors with output values which vary depending on oxygen concentration in the exhaust gas, respectively provided upstream and downstream of an exhaust gas purification catalytic converter arranged in an exhaust passage of the engine, and feedback controls a fuel supply quantity to the engine based only on an output value of the downstream second oxygen sensor, so that an air-fuel ratio of the engine intake mixture approaches a target air-fuel ratio, and under feedback control conditions, detects a phase difference between an output value of the upstream first oxygen sensor and an output value of the downstream second oxygen sensor. Deterioration of the exhaust gas purification catalytic converter is then diagnosed depending on the detected phase difference.

With such a construction, since the air-fuel ratio feedback control is carried out using the second oxygen sensor provided downstream of the catalytic converter, the exhaust gas oxygen concentrations upstream and downstream of the catalytic converter fluctuate over the same period, and a phase difference which is influenced by the oxygen storage effect in the catalytic converter, occurs between the oxygen concentration fluctuations upstream and downstream of the catalytic converter. Based on this phase difference, it thus becomes possible to diagnose a drop in storage effect due to deterioration of the catalytic converter.

For diagnosing deterioration of the downstream second oxygen sensor by comparing an output period of the downstream second oxygen sensor occurring during the air-fuel ratio feedback control with a predetermined judgment level, it is preferable to variably set the predetermined judgment level based on the diagnostic results for the exhaust gas purification catalytic converter.

With such a construction, fluctuations in the period due to a drop in oxygen storage effect in the exhaust gas purification catalytic converter can be distinguished from fluctuations in the period due to deterioration of the second oxygen sensor, so that fluctuations in the period due only to deterioration of the second oxygen sensor can be determined.

Moreover, when judging a deterioration condition of the exhaust gas purification catalytic converter, the judgment level may be set to a value smaller than that for a non deterioration condition.

With this arrangement, when the period of the air-fuel ratio feedback control becomes smaller due to a drop in the oxygen storage effect caused by deterioration of the catalytic converter, the judgment level is also set smaller. Deterioration of the second oxygen sensor can therefore be diagnosed even though a lengthening of the period due to deterioration of the second oxygen sensor may be offset by a reduction change in the period due to a drop in the oxygen storage effect.

Diagnosing a deterioration of the exhaust gas purification catalytic converter may involve judging a deterioration condition of the catalytic converter when a detected phase difference is smaller than a predetermined value.

With such a construction, since the phase difference between the oxygen concentration fluctuations upstream and downstream of the catalytic converter tends to become less with the drop in oxygen storage effect due to deterioration of the catalytic converter, it is possible to diagnose deterioration showing a drop in the oxygen storage effect.

Diagnosing a deterioration of the second oxygen sensor may involve judging an occurrence of response deterioration of the second oxygen sensor, when an output period of the downstream second oxygen sensor is greater than or equal to the predetermined judgment level.

With this arrangement, an occurrence of a delay in the output response of the oxygen sensor with respect to a rich to lean or lean to rich change of the air-fuel ratio, due to a deterioration of the oxygen sensor can be diagnosed.

Feedback control of the fuel supply quantity based only on an output of the second oxygen sensor may be carried out only at the time of operating conditions wherein the engine rotational speed and engine load are within respective predetermined limits.

With such a construction, the operating conditions for carrying out the diagnostic feedback control can be set so that this control can be stably carried out.

Other objects and aspects of the present invention will become apparent from the following description of an embodiment given in conjunction with the appended drawings.

DETAILED DESCRIPTION OF THE PREFERRED EMBODIMENT

Figure 1:
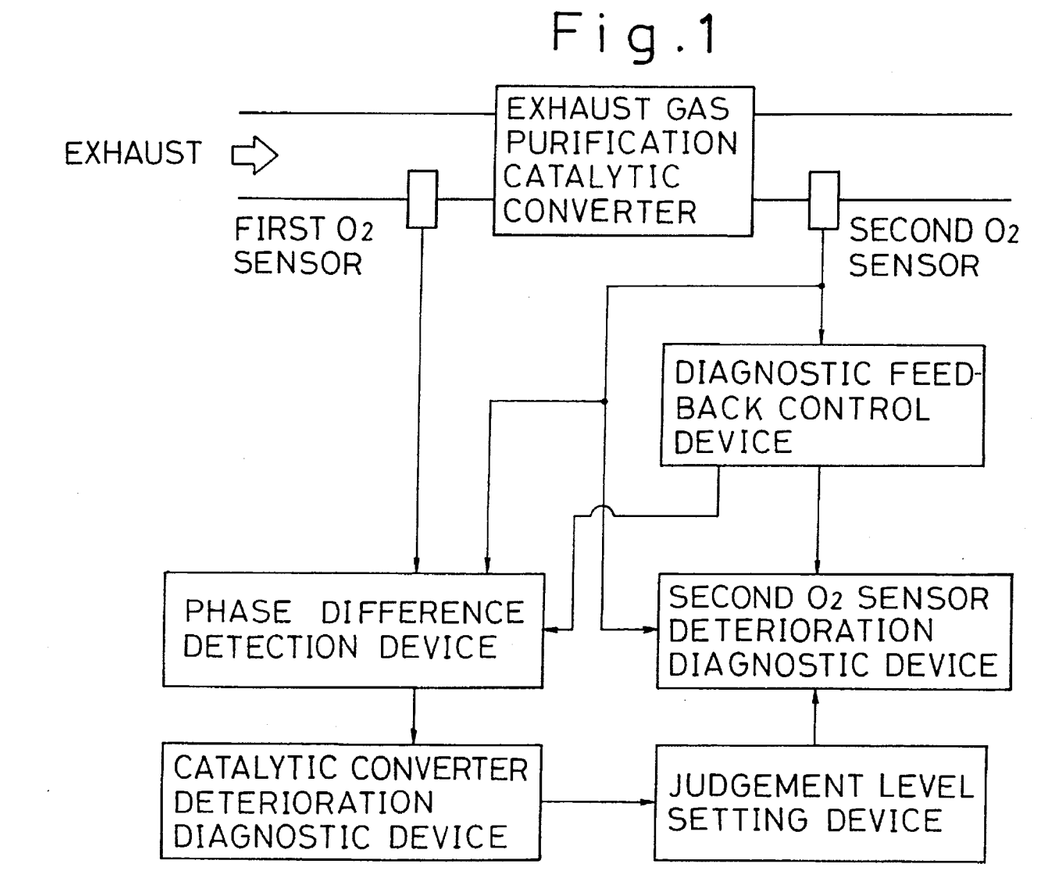
FIG. 1 is a block diagram showing a basic arrangement of a self diagnosis apparatus according to the present invention.

An embodiment of a method and apparatus for self diagnosis of an internal combustion engine according to the present invention is shown in FIG. 2 through FIG. 5, while a basic arrangement of the self diagnosis apparatus the internal combustion engine according to the embodiment is shown in FIG. 1.

Figure 2:
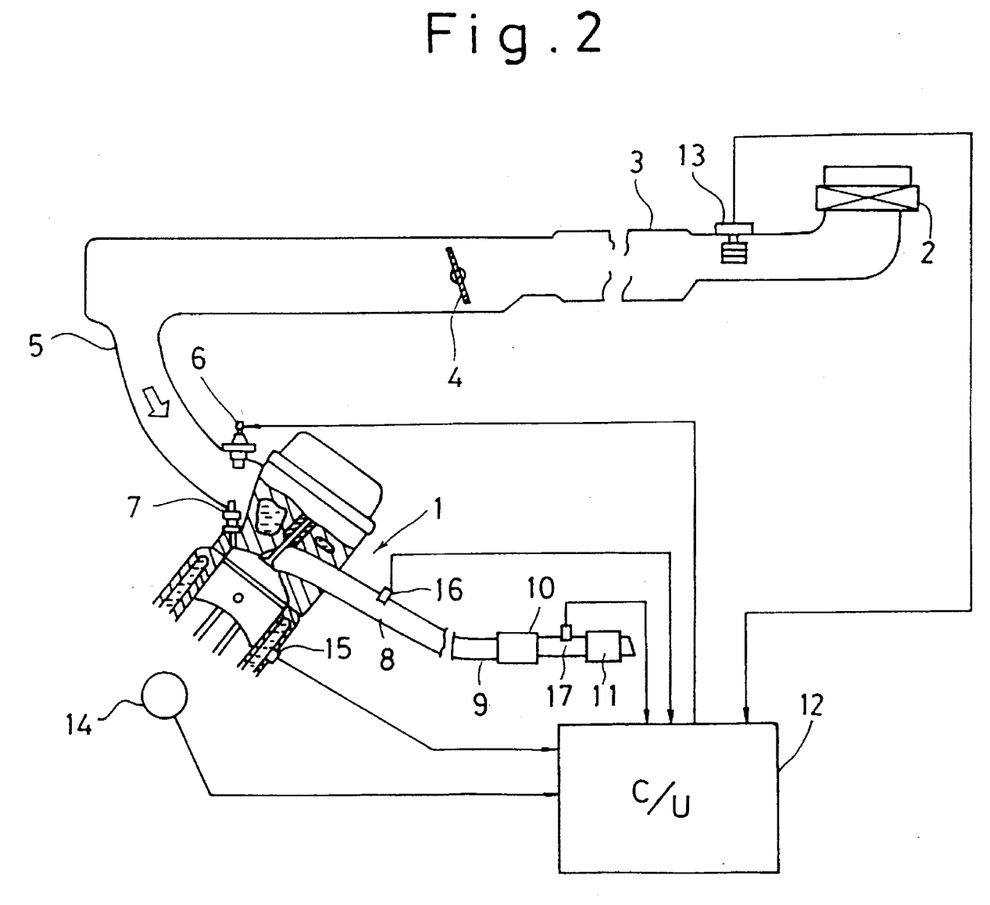
FIG. 2 is a schematic system diagram showing an embodiment of the present invention.

Referring to the system structure of the embodiment shown in FIG. 2, an internal combustion engine 1 draws in air from an air cleaner 2 by way of an intake duct 3, throttle valve 4, and intake manifold 5.

Fuel injection valves 6 are provided for each cylinder in respective branch portions of the intake manifold 5. The fuel injection valves 6 are electromagnetic type fuel injection valves which open with power to a solenoid and close with power shut-off. The injection valves 6 are driven open in response to an injection pulse signal provided by a control unit 12 (to be described later) so that fuel pressurized by a fuel pump (not shown), and controlled to a predetermined pressure by means of a pressure regulator, is injected to inside the intake manifold 5.

Ignition plugs 7 are provided for each combustion chamber of the engine 1 for spark ignition of a mixture therein.

Exhaust from the engine 1 is discharged by way of an exhaust manifold 8, an exhaust duct 9, a three-way catalytic converter 10 for exhaust gas purification (exhaust gas purification catalytic converter) and a muffler 11. The three-way catalytic converter 10 which is one having the beforementioned oxygen storage effect, reduces the NOx and oxidizes the CO and HC present in the exhaust gas, converting them into other harmless substances, with the conversion efficiencies for these reactions being at an optimum when the engine intake mixture is burnt at the theoretical air-fuel ratio.

The control unit 12 incorporates a microcomputer having a CPU, ROM, RAM, A/D converter and input/output interface. Detection signals from the various sensors are input to the control unit 12, and computational processing carried out (as described later) to thereby control the operation of the fuel injection valves 6.

For the various sensors there s provided in the intake duct 3, an airflow meter 13 such as a hot wire type or a flap type airflow meter, which outputs a voltage signal corresponding to an intake air quantity Q of the engine 1.

Also provided is a crank angle sensor 14 which outputs a reference crank angle signal REF for each predetermined piston position, and a unit crank angle signal POS for each unit crank angle. The period of the reference crank angle signal REF, or the number of unit crank angle signals POS for a predetermined period is measured to compute the engine rotational speed Ne.

Moreover, a water temperature sensor 15 is provided for detecting the cooling water temperature Tw in the water jacket of the engine 1.

There is also a first oxygen sensor 16 provided at a junction portion of the exhaust manifold 8 on an upstream side of the three-way catalytic converter 10, and a second oxygen sensor 17 provided on a downstream side of the three-way catalytic converter 10 upstream of the muffler 11.

The first oxygen sensor 16 and second oxygen sensor 17 are known sensors whose output values change in response to the concentration of oxygen in the exhaust gas. They are rich/lean sensors which utilize the fact that the concentration of oxygen in the exhaust gas drastically changes around the theoretical air-fuel ratio, to detect if the exhaust air-fuel ratio is richer or leaner than the theoretical air-fuel ratio.

Figure 3:
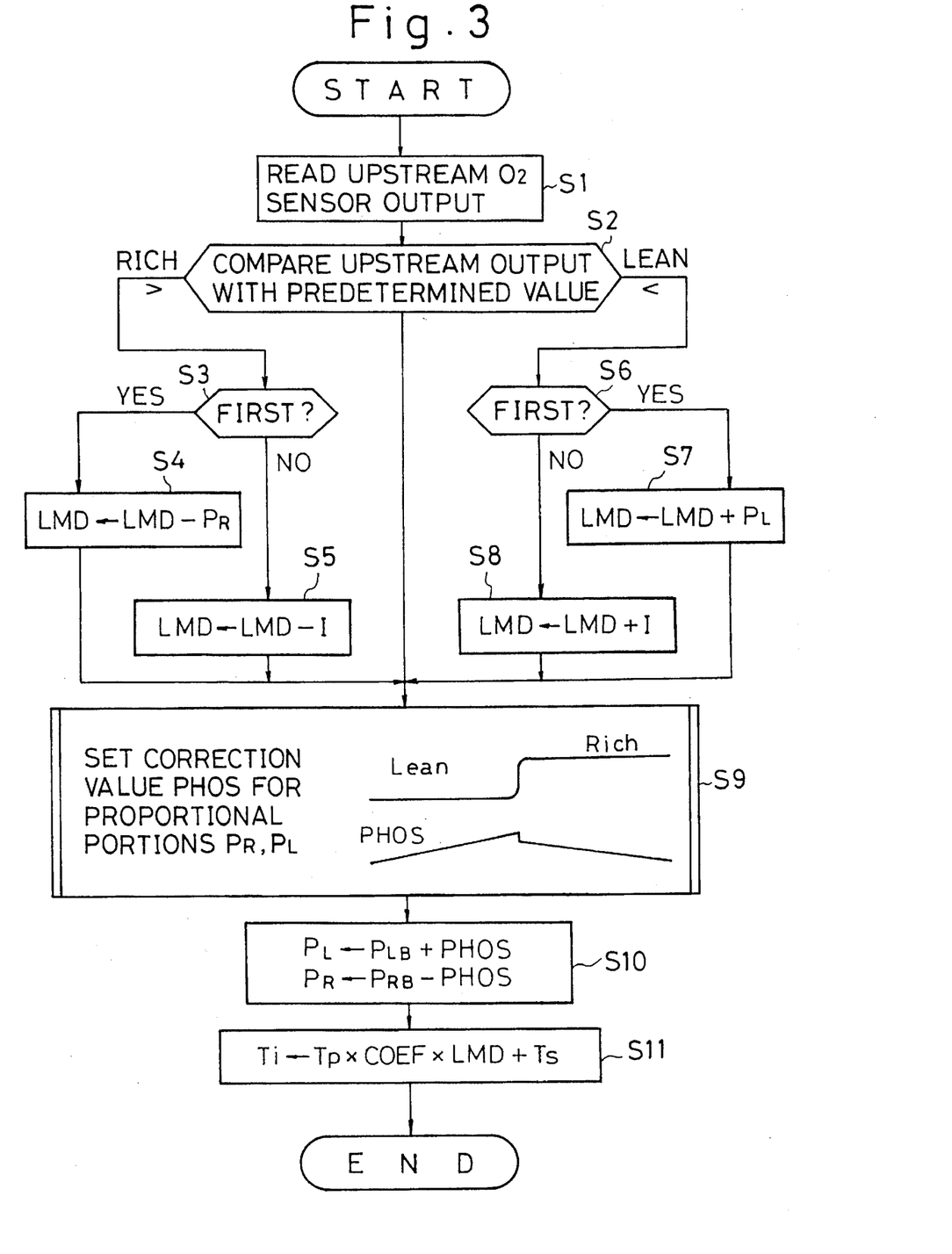
FIG. 3 is a flow chart showing an air-fuel ratio feedback control routine according to the embodiment.

When predetermined feedback control conditions are established, the CPU of the microcomputer in the control unit 12 proportional-plus-integral controls the air-fuel ratio feedback correction coefficient LMD according to the flow chart of FIG. 3 so that the outputs of the first and second oxygen sensors 16, 17 approach values corresponding to the target air-fuel ratio.

In the flow chart of FIG. 3, initially in step 1 (with "step" denoted by S in the figures), the output voltage of the upstream first oxygen sensor 16 is read.

Then in step 2, the output voltage read in step 1, is compared with a predetermined value corresponding to the target air-fuel ratio (theoretical air-fuel ratio) to judge if the actual air-fuel ratio is richer or leaner than the target air-fuel ratio.

When the output voltage is greater than the predetermined value so that the air-fuel ratio is judged richer, control proceeds to step 3 where it is judged if this is the first rich judgment.

If the first rich judgment, control proceeds to step 4, where a proportional control involving subtracting a proportional portion PR (set as described later) from the previous air-fuel ratio feedback correction coefficient LMD (of original value 1.0) is carried out to update the air-fuel ratio feedback correction coefficient LMD.

When judged in step 3 not to be the first rich judgment, control proceeds to step 5 where integral control involving subtracting a predetermined integral portion I from the previous air-fuel ratio feedback correction coefficient LMD is carried out to update the air-fuel ratio feedback correction coefficient LMD.

This reduction control of the air-fuel ratio feedback correction coefficient LMD corresponds to a correction to reduce the fuel injection quantity Ti. Hence, repetition of the integral control in step 5, changes the air-fuel ratio to a lean air-fuel ratio.

When judged in step 2 that the air-fuel ratio has been changed to a lean air-fuel ratio, control proceeds to step 6 where it is judged if this is the first lean judgment.

If the first lean judgment, control proceeds to step 7 where a proportional control involving adding a proportional portion PL (set as described later) to the previous air-fuel ratio feedback correction coefficient LMD is carried out to update the air-fuel ratio feedback correction coefficient LMD.

When judged not to be the first lean judgment, control proceeds to step 8 where integral control involving adding a predetermined integral portion I to the previous air-fuel ratio feedback correction coefficient LMD is carried out to update the air-fuel ratio feedback correction coefficient LMD.

In step 9, a correction value PHOS (originally equal to zero) for correcting basic proportional portions PRB, PLB by proportional-plus-integral control based on the output voltage of the second oxygen sensor 17, is controlled in a similar manner to the proportional-plus-integral control of the air-fuel ratio feedback correction coefficient LMD based on the output voltage of the first oxygen sensor 16, so that the air-fuel ratio detected by the second oxygen sensor 17 approaches the target air-fuel ratio (theoretical air-fuel ratio).

In step 10, the correction value PHOS is subtracted from the basic proportional portion PRB, and the result set to a proportional portion PR (PR=PRB−PHOS), and is added to the basic proportional portion PLB and the result set to a proportional portion PL (PL=PLB+PHOS).

The proportional portion PR is the proportional portion used in the beforementioned reduction control of the air-fuel ratio feedback correction coefficient LMD at the time of the first rich judgment, while the proportional portion PL is the proportional portion used in the beforementioned increase control of the air-fuel ratio feedback correction coefficient LMD at the time of the first lean judgment. The correction value PHOS is reducingly set when the second oxygen sensor 17 senses a rich air-fuel ratio. Hence when a rich air-fuel ratio is detected by the second oxygen sensor 17, control by the proportional portion PR in the lean direction increases, while control by the proportional portion PL in the rich direction reduces. The proportional control characteristics of the air-fuel ratio feedback correction coefficient LMD are thus changed in a direction so that the rich air-fuel ratio detected by the second oxygen sensor 17 approaches the target air-fuel ratio.

The correction value PHOS set using the second oxygen sensor 17 thus compensates for deviation of the air-fuel ratio control point in the air-fuel ratio feedback control using the detection results of the first oxygen sensor 16.

Correction control using the detection results of the second oxygen sensor 17 are not however limited to cor-rection control of the proportional portions PR and PL. For example, a construction is possible wherein the air-fuel ratio feedback control characteristics are changed by modifying a threshold level used at the time of rich/lean judgment based on the output of the first oxygen sensor 16, or by altering a time for forcibly delaying execution of the proportional control with respect to rich/lean detection by the first oxygen sensor 16.

The air-fuel ratio feedback correction coefficient LMD set in the above manner based on the output values of the first oxygen sensor 16 and the second oxygen sensor 17 respectively provided upstream and downstream of the three-way catalytic converter 10, is used in the next step 11 in computation of the fuel injection quantity Ti.

More specifically, the basic fuel injection quantity Tp is computed based on the intake air quantity Q and the engine rotational speed Ne (Tp=K×Q/Ne: where K is a constant). Also computed are for example various correction coefficients COEF based on operating conditions such as the cooling water temperature Tw, and a voltage correction amount Ts corresponding to battery voltage. The basic fuel injection quantity Tp is then corrected using for example the air-fuel ratio feedback correction coefficient LMD, the various correction coefficients COEF, and the voltage correction amount Ts, and the corrected result is set as the resultant fuel injection quantity Ti (Ti=Tp×COEF ×LMD+Ts).

The control unit 12 outputs to the fuel injection valve 6 at a predetermined injection timing, an injection pulse signal having a pulse width corresponding to the most recently computed fuel injection quantity Ti, thus controlling the injection quantity for the fuel injection valve 6 to produce a mixture having the target air-fuel ratio.

Figure 4:
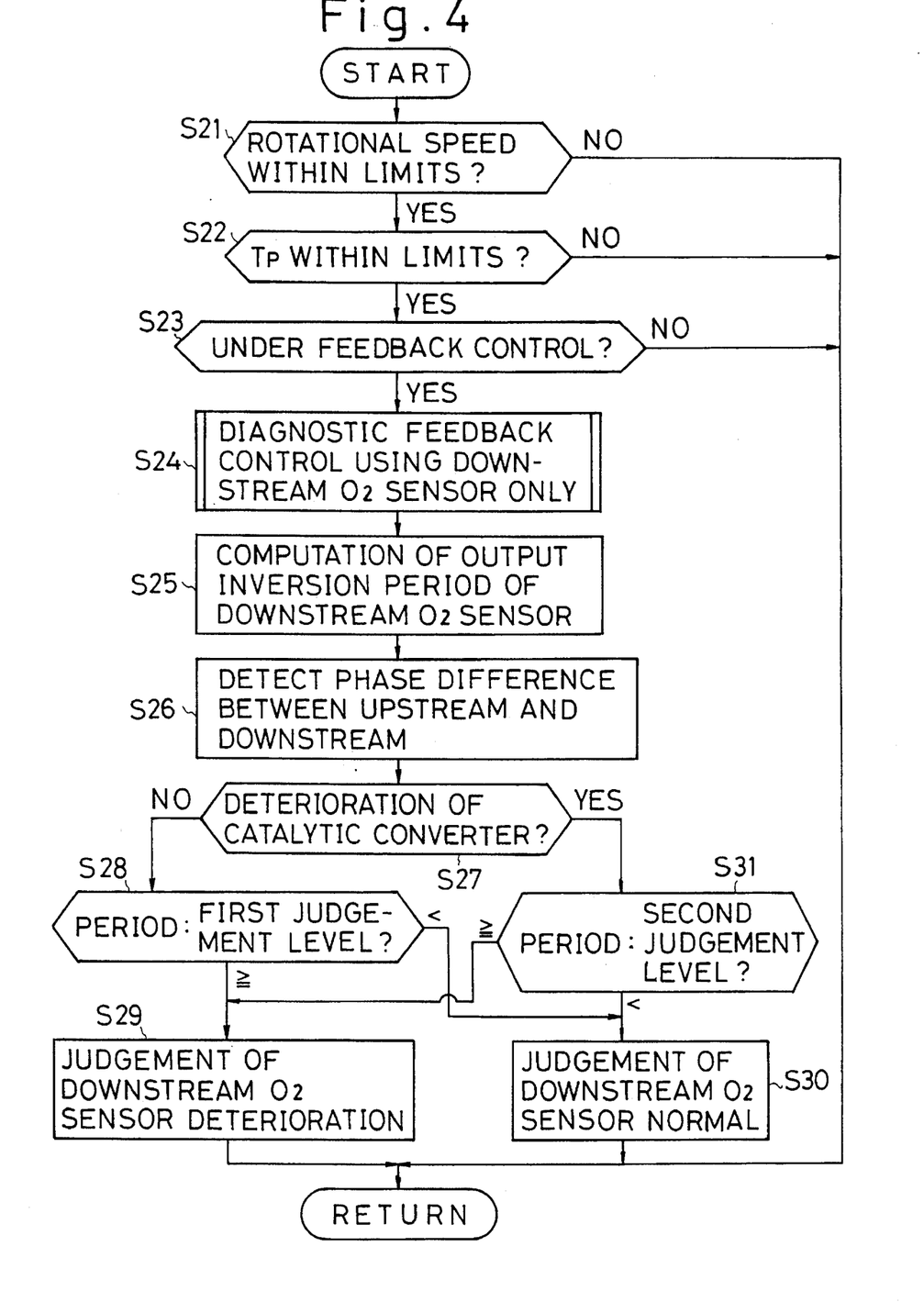
FIG. 4 is a flow chart showing a deterioration diagnosis routine for a downstream oxygen sensor according to the embodiment.

With the present embodiment the self diagnostic function which diagnoses a deterioration of the three way catalytic converter 10 and the downstream second oxygen sensor 17, that is to say the functions of a diagnostic feedback control device, a phase difference detection device, a catalytic converter deterioration diagnostic device, a second oxygen sensor deterioration diagnostic device, and a judgment level setting device as shown in FIG. 1, are realized by software illustrated by the flow chart of FIG. 4 and stored in the control unit 12.

Referring to the flow chart of FIG. 4, initially in steps 21 and 22 it is judged if values for the engine rotational speed Ne and the basic fuel injection quantity Tp (which corresponds to engine load) are within respective predetermined limits.

When values for the engine rotational speed Ne and the engine load Tp are within the respective predetermined limits, with operating conditions that the air-fuel ratio feedback control which uses only the second oxygen sensor 17 (to be described later) is stabilized, then control proceeds on to step 23 to determine if air-fuel ratio feedback control using the first and second oxygen sensors 16, 17 is being carried out.

When judged that the control conditions are established and air-fuel ratio feedback control is being carried out, then the predetermined diagnostic conditions are considered realized, and control proceeds to step 24.

In step 24, the proportional-plus-integral control of the air-fuel ratio feedback correction coefficient LMD as illustrated by the flow chart of FIG. 3 using the first oxygen sensor 16 and the second oxygen sensor 17 is terminated, and instead the air-fuel ratio feedback correction coefficient LMD is computed according to steps 1 through 8 in the flow chart of FIG. 3 using only the downstream second oxygen sensor 17. The fuel injection quantity Ti is then corrected based on the resultant air-fuel ratio feedback correction coefficient LMD.

In the next step 25, the output inversion period of the second oxygen sensor 17 under air-fuel ratio feedback control using only the downstream second oxygen sensor 17 (diagnostic feedback control condition)is computed. More specifically, the number of rich to lean or lean to rich inversions detected by the second oxygen sensor 17 within a predetermined time interval is counted.

Figure 5:
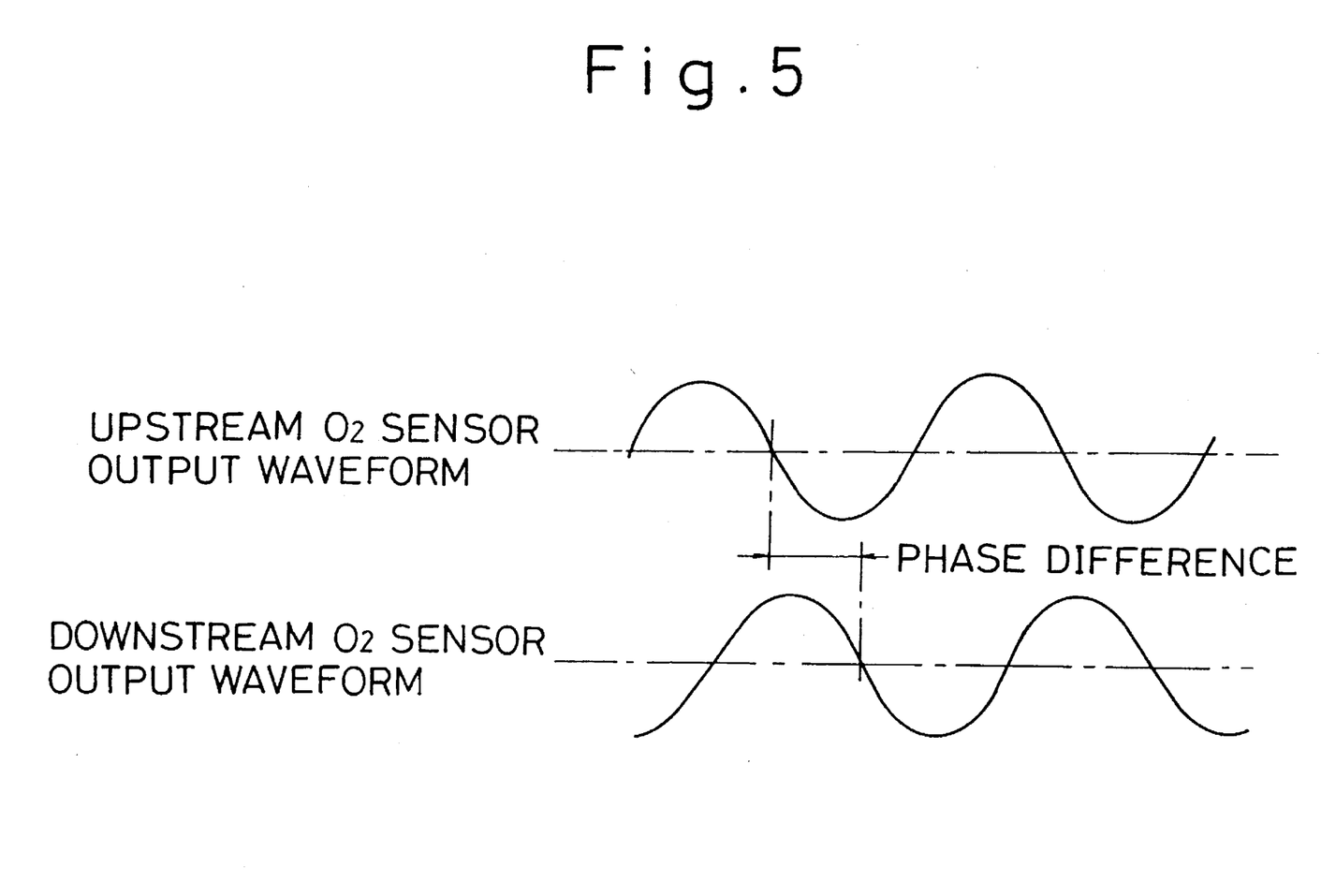
FIG. 5 is a time chart showing oxygen concentration phase difference between upstream and downstream of a catalytic converter.

Then in step 26, a phase difference, as illustrated by FIG. 5, between an output waveform of the upstream first oxygen sensor 16 and an output waveform of the downstream second oxygen sensor 17 is detected.

In this respect, under air-fuel ratio feedback control using only the downstream second oxygen sensor 17, the periods of the changes in oxygen concentrations (exhaust air-fuel ratio) upstream and downstream of the three way catalytic converter 10 become the same, and any change in phase difference is due to the influence of the oxygen storage effect of the three way catalytic converter 10.

In the next step 27, it is judged, based on the phase difference detected in step 26, if the three way catalytic converter 10 has an expected oxygen storage effect. When the three way catalytic converter 10 deteriorates, the oxygen storage effect drops. Hence the resultant phase difference which is influenced by the oxygen storage effect becomes smaller. Therefore, under the diagnosis conditions of the present embodiment, and using a previously obtained phase difference for when the three way catalytic converter 10 was in a new condition, a deterioration of the three way catalytic converter 10 (drop in oxygen storage effect) can be diagnosed in the case of a significant drop in the actual phase difference below the expected phase difference.

When judged in step 27 that the three way catalytic converter 10 has the expected oxygen storage effect, control proceeds to step 28 where the output inversion period of the second oxygen sensor 17 obtained in step 25 is compared with a first judgment level corresponding to a non deterioration condition of the three way catalytic converter 10.

Here, when the output inversion period of the second oxygen sensor 17 is judged to be greater than or equal to the first judgment level, the control period is judged to be extended due to deterioration of the response characteristics resulting from deterioration of the second oxygen sensor 17. Control then proceeds to step 29 to give a judgment of deterioration for the second oxygen sensor 17. On the other hand, when the output inversion period of the second oxygen sensor 17 is judged to be less than the first judgment level, the second oxygen sensor 17 is considered able to carry out air-fuel ratio control with a sufficiently small period due to having the expected response characteristics. Control then proceeds to step 30 to give a judgment of normal for the second oxygen sensor 17.

When judged in step 27 that the oxygen storage effect has dropped due to deterioration of the three way catalytic converter 10, control proceeds to step 31 where the output inversion period of the second oxygen sensor 17 obtained in step 25 is compared with a second judgment level (< the first judgement level) corresponding to a deterioration condition of the three way catalytic converter 10.

The reason for having the second judgment level is as follows. When the oxygen storage effect of the three way catalytic converter 10 drops, the control period for the second oxygen sensor 17 becomes short irrespective of the detection characteristics of the second oxygen sensor 17.

Hence, if a deterioration diagnosis is carried out using a judgment level equal to the first judgment level used when the oxygen storage effect is as expected, then in spite of a deterioration in response characteristics of the second oxygen sensor 17, it will be judged that the second oxygen sensor has normal response characteristics, due to the shortening of the response delay caused by the drop of the oxygen storage effect.

Therefore, when the oxygen storage effect of the three way catalytic converter 10 is dropping, the judgment level is made smaller to correspond to the shortening of the control period caused by the drop. Response deterioration of the second oxygen sensor 17 can thus be diagnosed from the air-fuel ratio control period using the second oxygen sensor 17, without being influenced by the shortening of the control period due to the drop of the oxygen storage effect.

When the actual control period is longer than tile second judgment level, then in a similar manner to the above, the response delay is judged to be due to a deterioration of the second oxygen sensor 17, while when the actual control period is shorter than the second judgment level, the second oxygen sensor 17 is judged to be detecting the oxygen concentration with expected response characteristics.

By the above process of estimating a change in the oxygen storage effect of the three way catalytic converter 10 and changing the judgment level on the basis of the estimated results, then deterioration diagnosis of the downstream second oxygen sensor 17 can be carried out stably without a reduction in accuracy at the time of a drop in the oxygen storage effect.

In the present embodiment the oxygen storage effect of the three way catalytic converter 10 is judged under either of two conditions, i.e. normal and deteriorated. However, a construction is also possible wherein the judgment level is linearly changed depending on the phase difference.

I claim:

1. An apparatus for self diagnosis of an internal combustion engine, said apparatus comprising;

first and second oxygen sensors with output values which vary depending on oxygen concentration in an exhaust gas, respectively provided upstream and downstream of an exhaust gas purification catalytic converter arranged in an exhaust passage of the engine, diagnostic feedback control means for feedback control of a fuel supply quantity to the engine based only on an output value of the downstream second oxygen sensor, so that an-air-fuel ratio of an engine intake mixture approaches a target air-fuel ratio, phase difference detection means for detecting a phase difference between the output value of the upstream first oxygen sensor and the output value of the downstream second oxygen sensor during feedback control by said diagnostic feedback control means, and catalytic converter deterioration diagnosis means for diagnosing depending on the phase difference detected by said phase difference detection means, if there is a deterioration of the exhaust gas purification catalytic converter.

2. An apparatus for self diagnosis of an internal combustion engine according to claim 1, said apparatus further comprising second oxygen sensor deterioration diagnostic means for diagnosing deterioration of said downstream second oxygen sensor by comparing an output period of said downstream second oxygen sensor occurring during feedback control by said diagnostic feedback control means with a predetermined judgment level, and judgment level setting means for variably setting the judgment level based on diagnostic results of said catalytic converter deterioration diagnostic means.

3. An apparatus for self diagnosis of an internal combustion engine according to claim 2, wherein when a deterioration condition of the exhaust gas purification catalytic converter is judged by said catalytic converter deterioration diagnosis means, said judgment level setting means sets a judgment level smaller than that for a non deterioration condition.

4. An apparatus for self diagnosis of an internal combustion engine according to claim 1, wherein said catalytic converter deterioration diagnosis means judges a deterioration condition of said exhaust gas purification catalytic converter when a phase difference detected by said phase difference detection means is smaller than a predetermined value.

5. An apparatus for self diagnosis of an internal combustion engine according to claim 2, wherein said second oxygen sensor deterioration diagnostic means judges an occurrence of response deterioration in said downstream second oxygen sensor, when an output period of said downstream second oxygen sensor is greater than or equal to the predetermined judgment level.

6. An apparatus for self diagnosis of an internal combustion engine according to claim 1, wherein said diagnostic feedback control means carries out feedback control of a fuel supply quantity only at the time of operating conditions wherein the engine rotational speed and engine load are within respective predetermined limits.

7. A method for self diagnosis of an internal combustion engine employing first and second oxygen sensors with output values which vary depending on oxygen concentration in an exhaust gas, respectively provided upstream and downstream of an exhaust gas purification catalytic converter arranged in an exhaust passage of the engine, said method including the steps of:

feedback controlling a fuel supply quantity to the engine based only on an output value of the downstream second oxygen sensor, so that an air-fuel ratio of the engine intake mixture approaches a target air-fuel ratio, detecting a phase difference between an output value of the upstream first oxygen sensor and an output value of the downstream second oxygen sensor during feedback control, and diagnosing a deterioration of the exhaust gas purification catalytic converter depending on a detected phase difference.

8. A method for self diagnosis of an internal combustion engine according to claim 7, further including a step of diagnosing deterioration of said downstream second oxygen sensor by comparing a judgment level which is variably set based on the diagnostic results for said exhaust gas purification catalytic converter, with an output period of said downstream second oxygen sensor occurring during said feedback control.

9. A method for self diagnosis of an internal combustion engine according to claim 8, wherein when a deterioration condition of the exhaust gas purification catalytic converter is judged, said judgment level is set to a value smaller than that for a non deterioration condition.

10. A method for self diagnosis of an internal combustion engine according to claim 7, wherein said step of diagnosing a deterioration of said exhaust gas purification catalytic converter, judges a deterioration condition of said exhaust gas purification catalytic converter when a phase difference detected in said phase difference detection step is smaller than a predetermined value.

11. A method for self diagnosis of an internal combustion engine according to claim 8, wherein said step of diagnosing deterioration of said downstream second oxygen sensor judges an occurrence of response deterioration in said downstream second oxygen sensor, when an output period of said downstream second oxygen sensor is greater than or equal to the predetermined judgment level.

12. A method for self diagnosis of an internal combustion engine according to claim 7, wherein said step of feedback controlling a fuel supply quantity based only on an output value of the downstream second oxygen sensor is carried out only at the time of operating conditions wherein the engine rotational speed and engine load are within respective predetermined limits.

13. A method for self diagnosis of an internal combustion engine employing first and second oxygen sensors with output values which vary depending on oxygen concentration in an exhaust gas, respectively provided upstream and downstream of an exhaust gas purification catalytic converter arranged in an exhaust passage of the engine, said method comprising the steps of:

monitoring an air-fuel ratio of the engine using the output value of the first oxygen sensor;

determining whether the air-fuel ratio of the engine is either greater than or less than a predetermined air-fuel ratio;

setting an air-fuel ratio correction coefficient based on the determination of whether the air-fuel ratio is greater than or less than the predetermined air-fuel ratio;

setting a correction value based only on the output value of the second oxygen sensor; and determining a fuel injection quantity of the engine using the correction value and the air-fuel ratio correction coefficient, wherein the correction value compensates for any deviation of the air-fuel ratio of the engine created by the output of the first oxygen sensor.

* * * * *